United States Patent Office.

WILLIAM ELMER, OF NEW YORK, N. Y.

Letters Patent No. 65,733, dated June 11, 1867.

---

PROCESS OF MANUFACTURING ILLUMINATING GAS.

---

The Schedule referred to in these Letters Patent and making part of the same.

---

TO ALL WHOM IT MAY CONCERN:

Be it known that I, WILLIAM ELMER, of the city, county, and State of New York, have invented a new and useful Method of Manufacturing Inflammable Gases; and I do hereby declare that the following is a full, clear, and exact description of my said invention; and in order that it may be more clearly understood I deem it necessary to present some facts in regard to the ordinary method of manufacturing illuminating gas.

In the manufacture of illuminating gas by the ordinary method many reactions and chemical changes occur, which depend, to a great extent, upon the temperature to which the gas material is subjected; for example, when gas coal is distilled at the lowest temperature at which the coal gives off gases and vapors the weight of coke or carbonaceous substance left in the retorts is much less than when subjected to a high heat, consequently the amount of carbon remaining combined with hydrogen is sufficient to form condensable hydrocarbon vapors, coal oil, and the complex substance known as coal tar, while a small quantity of gas only is produced. On the other hand, the higher the heat employed the greater is the quantity of gas produced, and the greater also is the weight of carbonaceous substance left in the retorts, and the smaller, therefore, is the amount of carbon combined with the hydrogen contained in the products given off, which are chiefly light carburetted hydrogen, volatile hydrocarbon vapors, carbonic acid, and carbonic oxide. The coal in all cases contains a large surplus of carbon over the hydrogen in the proportions of these two elements to form gas, and yet the gases produced by a high heat are always deficient in carbon, the very substance on which the light depends. Now, it has long been known that in making gas in the ordinary way, as the process advances, and the temperature of the retorts and their contents becomes elevated, less tar and condensable hydrocarbon vapors are formed, and a mixture of gases and volatile hydrocarbons which possess more equally the proper proportions of carbon and hydrogen necessary to form a good light is produced. But as the process advances the carbon in the gaseous mixture begins to diminish from the decomposition of olefiant gas and volatile hydrocarbons, and the carbon these contain, to a great extent, is deposited in the retorts, stand pipes, etc., in the form of crysene, pyrene, paranaphthaline, and free carbon or soot, while the hydrogen, especially as the temperature becomes still more elevated, soon appears greatly in excess of the carbon, until carbonic oxide and light carburetted hydrogen are produced in abundance; and lastly free hydrogen only is given off from the coke left, all non-illuminating agents.

The results produced by both these extremes of temperature are valueless to the gas-manufacturer, as they constantly tend to one or other of two narrow extremes, both wasteful. With too high heat an excess of diluents is produced, which thins the gaseous mixture and deprives it of carbon. With too low heat an excess of tar and other condensable hydrocarbons is produced, and which are constituted mainly of the two essential elements of illuminating gas, hydrogen and carbon, and these are entirely lost so far as the production from them of gases is concerned, although these substances amount to fully one-half of the products of the coal. Gas coal subjected to a medium temperature, were it possible to maintain such a temperature, would not even then be productive of economy. The volume of gases produced would be larger than under a low heat, but much less than the volume produced by the high heat. With the gases evolved by a medium temperature would also be produced hydrocarbon vapors, some of which remain with the gases produced, and are a variable source of their luminosity when burned; but the greater proportion of these hydrocarbon vapors is condensed and wasted in the process of washing the gas, while other hydrocarbons form the substance known as coal tar, as under a low heat, though not to the same extent.

In the ordinary process of gas-making, where a charge of several hundred-weight of coal, often in large lumps, is thrown into an ignited retort, it is impossible to maintain a uniform temperature. The heat is conducted very gradually to the interior of the mass of coal, while the exterior portion becomes highly heated, and therefore various portions of the charge are exposed to very unequal temperatures, especially in the earlier stages of distillation. The natural and inevitable consequences of this condition are the production of a gaseous mixture of very poor illuminating power, and a waste of the very best light-giving material, which substances, according to the uncontradicted testimony of every one who has examined the subject, hold as much illuminating material as exists in the gases finally obtained. The quantity of gas manufactured by any process depends upon the volume of hydrogen evolved from the gas material employed, if we except the presence of carbonic oxide, and the luminosity of the gas depends upon the amount of carbon combined with the hydrogen, or conduced by it to the flame. When we therefore consider that in all cases gas stock, whether it be coal, oil, or bituminous matter in any other form, invariably contains an excess of carbon over the hydrogen, it is certainly evident that the hydrogen contained in the tar and in the other condensable hydrocarbons is just so much waste in volume of gas. There are also other elements in some kinds of gas material which go still further in appropriating hydrogen. Thus a portion of the hydrogen contained in gas coal, uniting with the oxygen present, produces water. Some of the hydrogen unites also with a portion of the sulphur present, forming sulphuretted hydrogen, and again a portion of the hydrogen combines with the nitrogen present, producing ammonia. Thus a large quantity of the hydrogen contained in the gas material is appropriated to the formation of other compounds than illuminating gases. This fact also explains the reason of the formation of coal tar and the other condensable hydrocarbons, instead of illuminating gases.

If all the hydrogen present in the gas material were to unite with its corresponding equivalents of carbon, in the required proportions of these two elements to form some definite gaseous compound, there would be no formation of tar or other condensable hydrocarbons, but gas and coke only would be formed, so far as these two elements are concerned. It is not surprising, then, that so many efforts should have been made to supply to the carbon an additional quantity of hydrogen from some extraneous source, as in the "water-gas" process.

If we examine what really takes place in the process of manufacturing illuminating gases in the ordinary way, we will find that a considerable portion of the hydrogen contained in the coal is appropriated to the formation of aqueous vapor, which is disposed in two ways. A portion of it is decomposed by the red-hot carbon present, forming carbonic acid, carbonic oxide, and hydrogen, while the greater portion of it is condensed into water and passes off by the hydraulic main. Why, then, introduce more steam into the retorts, when they are constantly giving off water? The source of carbonic acid and carbonic oxide in coal gas is the decomposition of aqueous vapor by carbon, and not a direct union of oxygen with carbon. The oxygen present exists principally in the coal. A small proportion is also derived from the atmosphere in charging the retorts. The oxygen of the atmosphere introduced into the retorts would unite directly with the carbon. Then, as the oxygen exists in the gas coal, it must necessarily be present in manufacturing gas from coal. The question is, how to dispose of the oxygen so as to prevent the great waste of hydrogen, with which it combines to form water? The condensable hydrocarbons obtained from the coal operated upon contain no oxygen.

The formation of aqueous vapor takes place under all temperatures, from that sufficient to decompose the coal to the highest heat to which it is subjected, but the greater proportion is formed simultaneously with that of the condensable hydrocarbons, which, however, are very irregularly given off when a large mass of coal is introduced suddenly into heated retorts.

The practice of throwing a large quantity of coal into heated retorts, as is usual in gas-works, is attended with great disadvantages. In the first place the temperature of the retorts is immediately lowered, so that a large quantity of fuel is necessarily expended in again raising the temperature to the degree of heat essential to the process of distillation, and in the second place the products of distillation are for the most part complex, heterogeneous substances. No uniformity in the character of these products can be obtained under such circumstances, while the losses attending these results are considerable, and at the same time the products are not of the character desirable. Moreover, the quantity of poisonous gases and vapors and particles of carbon or soot constantly permeating the atmosphere of gas-houses is very great, and consequently destructive to health.

To sum up, then, in a general way, it may be stated, first, that the ordinary methods of manufacturing what are called "illuminating gases" are neither productive of economy, nor gases of a satisfactory character; and, second, the manufacture is a great nuisance in all cities and towns where the gases are made, and noxious not only to the operators but also to the public health. To obviate these objections, and at the same time produce a good artificial light, so as to cheapen one of the prime necessities of life, constitute the new system of gas-manufacture, the *modus operandi* of which is as follows:

An ordinary bench, consisting of the usual number of retorts, or any number desirable, may be employed. The retorts are D-shape and arranged in a bench in the usual way, but instead of only one mouth-piece to each retort, there are two, one attached to either end. The stand pipe is situated at the back end of each retort, instead of the front, as is usual in gas-works. To each of the front mouth-pieces is attached an upright supply pipe, which terminates in a rotary valve. Within the mouth-piece is arranged a receiver, which is made to fit closely the bottom and about half of the area of the retort. The supply pipe is connected with this receiver, which also contains a slide. To this slide is attached a rod protruding through a stuffing-box in the lid of the mouth-piece. To the under side of the mouth-piece, on the opposite end of each retort, is attached a discharge pipe or tube, which is made to dip into a reservoir of coal tar. A valve is placed in the mouth-piece just above, and covers, when closed, the upper and open end of the tube. This valve is only designed as a convenience to close the retort when the process is not in operation, or in case of repairs.

For illustration of this description, reference is made to the accompanying drawings, which form a part of this specification.

The gas coal is introduced into the supply tube through the rotary valve, which is made gas-tight, and as the valve rotates a certain quantity of coal drops into the receiver and is carried or pushed forward by the slide by means of the projecting rod into the heated retort, which is maintained at a full red heat or a heat approaching to whiteness, according to the character of the material subjected to the process. The gas contained in the chambers of the valve, taken up from the tube as the valve rotates, is displaced by exhaustion and discharged into the main leading to the gas-holder. The charge of coal occupying each retort is divided into four equal parts. As the first part of the coal approaches the heat the volatile products begin to be given off from the coal, which, as it is slowly carried forward in a thin stratum under a greater heat, parts with all the volatile substances it is capable of yielding, and where these substances are converted into permanent gases. After the volatile products are mostly given off from the first portion of the coal, it is pushed forward in the retort, where it is retained until all the gases are given off, after which this portion of the coal, which has now become coke, is moved onward and the aqueous vapor formed in the retort is brought in contact with the highly-heated coke, by which means a portion of the aqueous vapor is decomposed. The whole of the aqueous vapor may be decomposed by the addditional aid of electricity. Two platinum wires are introduced through insulators, which are inserted in the lids of the mouth-pieces of each retort and the wires brought within a few inches of each other in the hottest part of the retorts. These wires are connected with a thermo-electric or other battery, and constitute positive and negative poles. The coke is then pushed forward and drops into the discharge pipe, and is raked up from the bottom of the reservoir on an inclined plane, where the tar is allowed to drain off from the coke and flow back again into the reservoir. In the mean time other portions of coal are brought forward in the same way, by which the operation is made continuous without opening the retorts for the supply of coal or the discharge of coke. The object of placing the stand pipe at the rear end of the retorts, instead of the front, as is usual, is to afford a free and immediate exit for the gases from the retorts nearest the point where they are formed.

The Philosophy of the New System.

That this system constitutes the true philosophy of manufacturing illuminating gases will appear evident when we consider the nature of the reactions that take place in the process. The coal is introduced into the retorts continuously in a thin stratum, and is made to approach the heat gradually, by which every particle of the coal is exposed alike to the action of heat, whereby it parts with all the volatile products it is capable of yielding, leaving a carbonaceous substance in the form of coke, a useful product as fuel in the process of gas-making. The aqueous vapor, as fast as formed in the retorts, is brought directly in contact with the highly-heated coke and between the points of the platinum poles, one of which is placed in contact with the carbon or coke, and the other in contact with the gases evolved. The platinum in contact with the gases acts as the positive metal. Between them the particles of aqueous vapor become polarized and undergo electrolytic decomposition, setting free carbonic acid, carbonic oxide, and hydrogen. The latter element in the act of its liberation from the aqueous vapor is so exalted as to instantly combine with a portion of the carbon in the volatile products, forming a definite hydrocarbon gas, while the volatile products, also partaking in the reactions, are converted into illuminating gases. A very small electric spark passed through this mixture of gases and carbon vapors causes the hydrogen instantly to unite with the latter in the combining proportions to form some definite compound. This effect is due to the direct exaltation of the chemical affinities of these bodies induced by the action of electricity.

Only that portion of the coal that has been deprived of volatile products, and is brought to a full red heat, is capable of decomposing water; hence only a portion of the aqueous vapor formed in the ordinary process of gas-making is decomposed, while by the new method the aqueous vapor is brought directly in contact with the coke, and by the additional aid of electricity the decomposition is not only rapid and complete, but involves also the decomposition of a portion of the carbonic acid. When water is decomposed by highly heated carbon out of contact with the air an electric current is produced, the vapor of water becoming the electrolyte, and is decomposed by the hot charcoal just as the water in an ordinary voltaic couple is decomposed by the zinc, so that the charcoal becomes charged with $-E$, and the aqueous vapor and carbonic acid with $+E$.

Chemical action is always accompanied by disturbance of the equilibrium between the molecules of a body, and may therefore be expected to give rise to electric excitement. It is true that if the whole of the aqueous vapor formed in the process of gas-making be decomposed, there would be an increase of carbonic oxide remaining with the gases formed, but, on the other hand, there would also be a large volume of hydrogen appropriated to the formation of illuminating gases. About fifty per cent. more of illuminating gases is made by the new method than by the ordinary process, while the gases have also a higher illuminating power, from the fact that both acetylene and olefiant gases are produced by this method and in much larger quantities than by the ordinary process. Again, the amount of gases and volatile hydrocarbons that are lost in the ordinary way of charging the retorts is by no means a small item. The loss from each bench of retorts has been estimated at an average of a hundred cubic feet every time the charges are withdrawn and the retorts again charged. This estimate, which is probably too low, would amount to six hundred cubic feet of gases from each bench in twenty-four hours, provided the retorts were always charged every four hours, which is the ordinary rule. At this rate in all large gas-works a loss of several thousand cubic feet of gases occurs every twenty-four hours.

It has been shown that by the use of Clegg's revolving web-retort a gain of about two thousand cubic feet of gas per ton of coal is obtained over the ordinary method. In this case the gain is due to two facts: first, there is no loss of gas from opening the retorts; and, second, the coal is subjected to the heat in a thin stratum, by which it yields a larger quantity of gases than when thrown into the retorts in large masses.

Advantages of the New Method.

1. By this method the entire volatile products of the coal or other material are converted into permanent illuminating gases and ethereal hydrocarbons; hence no tar or other condensable hydrocarbon is formed.

2. Fully fifty per cent. more gases from a given quantity of material is made by this system than by the ordinary process, while the luminosity of the gases is much superior.

3. The gases do not deteriorate like ordinary coal gas; hence there is no condensation of volatile hydrocarbons in the purification of the gases, nor in the holder or mains.

4. The new method of gas-manufacture is not confined to bituminous coal, but any one of the great variety of other hydrocarbons may be used, most of which abound quite as much, weight for weight, in elements convertible into substantially the same illuminating gases as those obtained from the best cannel coal, and some of them still more so; among the valuable material of this nature being all forms of bitumen, asphaltum, rock oil, or petroleum. The latter, when mixed with woody fibre in the form of saw-dust, and also when mixed with peat, produces most brilliant illuminating gases.

5. A uniform temperature is easily maintained, and the expense for fuel is much less than in the ordinary process, while the advantages of charging and discharging the retorts by a continuous process are that it requires much less manual labor, as the whole process can be worked by machinery, and at the same time the retort-house may be kept perfectly clean, wholesome, and free from poisonous gases, vapors, and carbon or soot.

*Claims.*

What I claim as my invention, and desire to secure by Letters Patent, is—

1. The construction of a tube attached to the mouth-piece of each retort, and terminating in a gas-tight rotary supply-valve, through which coal or other material for generating inflammable gases is introduced, out of contact with the atmosphere, into the retorts, and moved forward by means of a receiver and slide situated within the mouth-piece, substantially as above set forth, and this I claim whether accomplished by a rotary valve, or otherwise.

2. I also claim the construction of an outlet tube from the further or back end of each retort, the end of which tube is sealed by dipping into a reservoir of coal tar or other suitable substance, (so as to exclude the air from entering the retorts and to prevent the escape of the gases generated in the retorts,) by which the coke is discharged without opening the retorts, substantially as above set forth.

3. I claim the method of subjecting the gas material within the retorts in a gradual manner to the heat, and as the process advances, and the volatile products are given off, the gas material is moved forward until brought in contact with the highest heat, where it is converted into gases, substantially as above set forth; and this I claim whether the coal or other material employed in gas-making is conveyed into the retorts in the precise manner described by me, or otherwise.

4. I further claim the application of a current of electricity introduced into the retorts for the purpose of decomposing the aqueous vapor formed in the process of gas-making, and also for the purpose of inducing the chemical affinities of certain elementary bodies present, by which a gaseous compound is formed, as above described.

5. I further claim the combination of the gas-making retort with an electric battery, (excited either by heat or by chemical solutions,) substantially as above described.

In testimony whereof I have hereunto set my hand this eighteenth day of January, A. D. 1867.

WILLIAM ELMER.

Witnesses:
A. SHEDLOCK,
F. W. WURSTER.